United States Patent
Kurauchi

(10) Patent No.: US 10,681,191 B2
(45) Date of Patent: Jun. 9, 2020

(54) COMMUNICATION DEVICE AND RECEIVING DEVICE

(71) Applicant: HONDA MOTOR CO., LTD., Minato-ku, Tokyo (JP)

(72) Inventor: Atsushi Kurauchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 99 days.

(21) Appl. No.: 15/916,409

(22) Filed: Mar. 9, 2018

(65) Prior Publication Data
US 2018/0270337 A1 Sep. 20, 2018

(30) Foreign Application Priority Data
Mar. 16, 2017 (JP) .................................. 2017-051780

(51) Int. Cl.
*H04L 29/14* (2006.01)
*H04L 12/24* (2006.01)
*H04W 88/06* (2009.01)

(52) U.S. Cl.
CPC .......... *H04L 69/40* (2013.01); *H04L 41/0668* (2013.01); *H04L 41/0816* (2013.01); *H04W 88/06* (2013.01)

(58) Field of Classification Search
None
See application file for complete search history.

(56) References Cited

U.S. PATENT DOCUMENTS

| 7,936,883 B2 * | 5/2011 | Imai ...................... H04L 9/0852 380/201 |
| 2009/0268606 A1 * | 10/2009 | DeLew ............... H04L 41/0663 370/216 |
| 2011/0029681 A1 * | 2/2011 | Lee ......................... H04L 69/08 709/230 |
| 2011/0138457 A1 * | 6/2011 | Jolfaei ................ H04L 63/0209 726/14 |
| 2015/0124597 A1 | 5/2015 | Mabuchi et al. |
| 2016/0043919 A1 * | 2/2016 | Connelly ............... H04L 41/28 709/220 |

FOREIGN PATENT DOCUMENTS

| JP | 2009-130480 | 6/2009 |
| WO | 2013/171829 | 11/2013 |

OTHER PUBLICATIONS

Japanese Office Action for Japanese Patent Application No. 2017-051780 dated Aug. 21, 2018.

* cited by examiner

*Primary Examiner* — Brian Whipple
(74) *Attorney, Agent, or Firm* — Amin, Turocy & Watson, LLP

(57) ABSTRACT

A communication device of an embodiment includes a communication control unit capable of transmitting a signal based on a plurality of different communication protocols and changing a communication protocol used for communication from a first communication protocol to a second communication protocol, in which the communication control unit does not transmit a signal based on a third communication protocol until a signal based on the second communication protocol is transmitted, but transmits a signal based on the second communication protocol in which at least two of a plurality of communication elements defined by the first communication protocol are changed.

5 Claims, 6 Drawing Sheets

PROCESSING ON RECEPTION SIDE

PROCESSING ON TRANSMISSION SIDE

PROCESSING ON TRANSMISSION SIDE

PROCESSING ON TRANSMISSION SIDE

PROCESSING ON TRANSMISSION SIDE

COMMUNICATION DEVICE AND RECEIVING DEVICE

CROSS-REFERENCE TO RELATED APPLICATION

Priority is claimed on Japanese Patent Application No. 2017-051780, filed on Mar. 16, 2017, the contents of which are incorporated herein by reference.

BACKGROUND

Field of the Invention

The present invention relates to a communication device and a receiving device.

Background

Conventionally, a communication management apparatus which is a communication management apparatus of a vehicle network for managing data communication in a vehicle network in which transmission or reception of communication data is performed between a plurality of vehicle control devices, and, when it is detected that communication data with common identification information given to the vehicle control device is transmitted at the same time, executes processing of changing a transmission timing of the communication data transmitted at the same time from a timing assigned to the communication data as an arbitration processing for arbitrating communication data given common identification information is disclosed (for example, refer to PCT International Publication No. 2013/171829). This device executes processing of changing identification information given to the vehicle control device when an abnormality of a predetermined level or more is detected in communication after transmission of a data frame in which the transmission timing is changed.

SUMMARY

However, there are some cases in which it is not possible to determine whether a data frame transmitted by the device is a data frame in which the communication element is intentionally changed by a transmission side, or a data frame in which a communication element becomes different from that at normal times due to an abnormality such as a breakdown on a reception side.

An object of an aspect of the present invention is to provide a communication device and a receiving device capable of transmitting a signal in which an intentional change of communication elements can be recognized on a reception side.

(1) A communication device according to an aspect of the present invention includes a communication control unit capable of transmitting a signal based on a plurality of different communication protocols and changing a communication protocol used for communication from a first communication protocol to a second communication protocol, in which the communication control unit does not transmit a signal based on a third communication protocol until a signal based on the second communication protocol is transmitted, but transmits a signal based on the second communication protocol in which at least two of a plurality of communication elements defined by the first communication protocol are changed.

(2) In the communication device described above, the communication element defined by the communication protocol may include at least one of a transmission order of the signal, a transmission timing of the signal, a transmission cycle of the signal, identification information of the signal, a data length of the signal, regulations when the signal is encrypted, regulations when an error detection code of the signal is generated, and regulations when an alive counter is given to the signal.

(3) The communication device described above may include a detection unit configured to detect an abnormality of a network, in which the communication control unit may change a communication protocol used for communication from the first communication protocol to the second communication protocol when a predetermined abnormality is detected by the detection unit.

(4) A receiving device according to another aspect of the present invention includes: a communication unit configured to communicate with the communication device described above; and a determination unit configured to determine that, when only one communication element among the plurality of communication elements is changed in a signal received by the communication unit, the received signal is an unauthorized signal.

(5) In the receiving device described above, the determination unit may not determine that, when two communication elements set in advance among the plurality of communication elements are changed in a signal received by the communication unit, the received signal is an unauthorized signal.

(6) A receiving device according to still another aspect of the present invention includes: a communication unit configured to communicate with the communication device described above; and a communication control unit configured to execute a first fail safe mode when only one communication element among the plurality of communication elements is changed in a signal received by the communication unit and to execute a second fail safe mode when at least two communication elements among the plurality of communication elements are changed in a signal received by the communication unit.

(7) A receiving device according to still another aspect of the present invention includes: a communication unit configured to receive a signal transmitted by a communication device communicating with a communication network; and a determination unit configured to determine that, when only one communication element among a plurality of communication elements set by a predetermined communication protocol is changed in a signal received by the communication unit, the received signal is an unauthorized signal, and to not determine that, when at least two communication elements among the plurality of communication elements are changed, the received signal is an unauthorized signal.

According to the configurations of (1) to (3) described above, it is possible to transmit a signal in which an intentional change of communication elements can be recognized on a reception side.

According to the configurations of (4) to (7) described above, it is determined that, when only one communication element among a plurality of communication elements is changed in a signal received by a communication unit, the received signal is an unauthorized signal by a determination unit of a receiving device, and thus it is possible to discriminate between a signal in which a communication element is changed unintentionally and a signal in which a communication element is changed intentionally.

DESCRIPTION OF THE EMBODIMENTS

Hereinafter, embodiments of a communication device and a receiving device of the present invention will be described with reference to the drawings.

Figure 1:
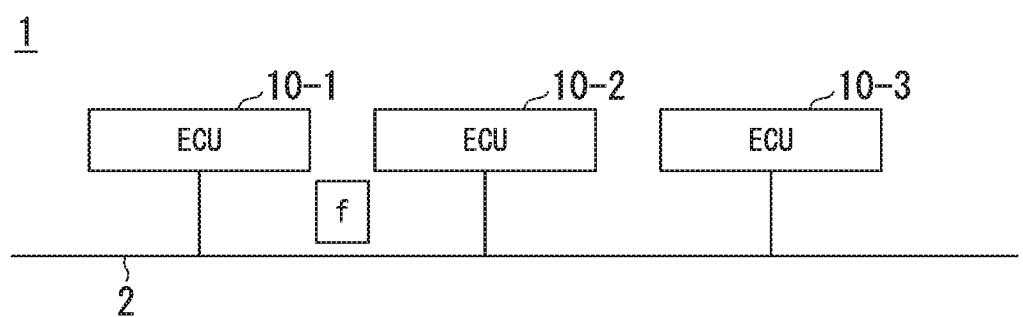
FIG. 1 is a diagram which shows a configuration of a communication system.

FIG. 1 is a diagram which shows a configuration of a communication system 1. The communication system 1 is, for example, mounted in a vehicle, and constitutes a network in the vehicle. The communication system 1 includes ECUs 10-1 to 10-3 connected to a communication path 2. Hereinafter, unless there is distinction between the ECUs 10-1 to 10-3, they are simply referred to as an ECU 10. In addition, the number of the ECUs 10 is not limited to three, and may be one, two, four, or more. The ECU 10 is an example of a "communication device," and may be an example of a "receiving device."

In the communication system 1, for example, communication based on a communication system such as a controller area network (CAN) protocol or IEEE 802.3 is performed via the communication path 2.

The ECU 10 is, for example, an engine ECU that controls an engine, a seat belt ECU that controls a seat belt, or the like. The ECU 10 receives a frame transmitted to a network of the communication system 1. Hereinafter, each frame (signal) transmitted to the network is referred to as a frame f. Each frame f is given an identifier (hereinafter referred to as an ID). A storage unit of the ECU 10 stores information of an identifier (hereinafter referred to as a registration ID) to be processed by the ECU 10. When a frame f is received, the ECU 10 refers to an ID given to the received frame f, and extracts and acquires the frame f to which the same ID as a registration ID is given, and a frame f to which an ID different from a registration ID is given is a frame f which is not subjected to processing and is not acquired.

Figure 2:
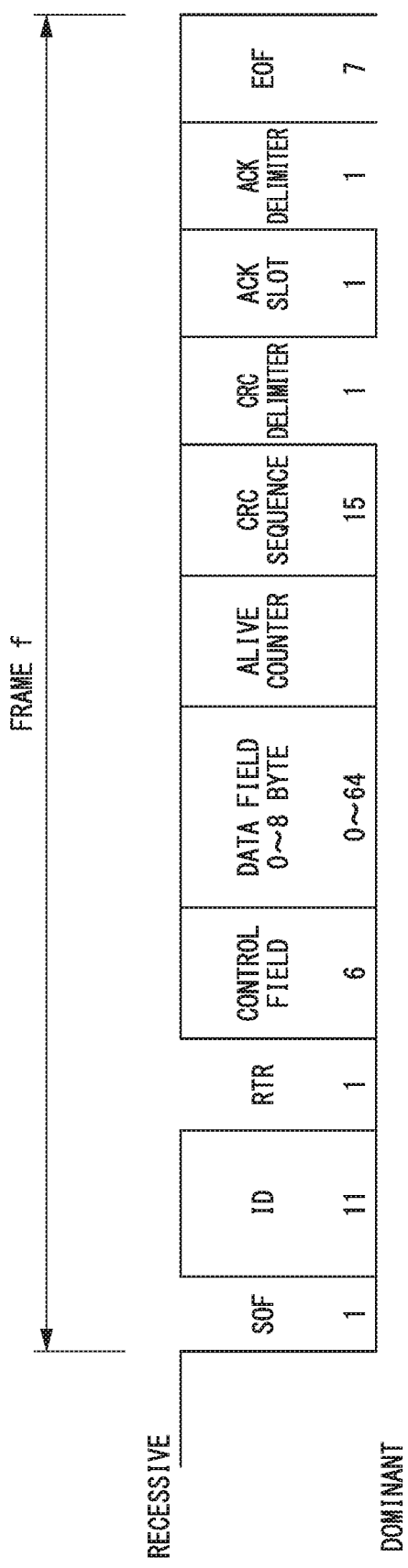
FIG. 2 is a diagram which shows an example of a frame.

A format example of a frame f transmitted to the communication path 2 by the ECU 10 will be described. FIG. 2 is a diagram which shows an example of the frame f. A frame f transmitted in one transmission includes, for example, a start of frame (SOF) representing a start of the frame f, an ID which is an identifier of the frame f, a remote transmission request (RTR) for identifying the frame f and a remote frame (a frame obtained by excluding a data field from the frame f), a control field indicating the number of bytes of the frame f or the like, a data field which is the substance of the frame f to be transferred, an alive counter to which identification information is given, a CRC sequence which adds a CRC for checking an error of the frame f, an ACK slot and an ACK delimiter which receive a notification (ACK notification) from a unit (for example, the ECU 10) which has received a correct message, an end of frame (EOF) representing an end of the frame f, and the like.

In the communication path 2, communication arbitration based on a priority represented by an ID and an RTR is performed. Frames f with smaller ID values have higher priority. When frames f are transmitted from the plurality of ECUs 10 at the same time, each ECU 10 compares results of monitoring a frame f transmitted thereby and a state of the communication path 2. Here, when recessive frames and dominant frames have been transmitted from different ECUs 10 at the same time, the dominant frames take priority, and the state of the communication path 2 becomes dominant. At this time, an ECU 10 which has transmitted a recessive frame determines that communication arbitration has failed due to the state of the communication path 2 being different from a state transmitted thereby and stops transmission of a frame f. For this reason, when transmission of frames f from the plurality of ECUs 10 is started at the same time and one ECU 10 transmits a recessive frame, if another ECU 10 transmits a dominant frame, the ECU which has transmitted the dominant frame corresponding to a frame f having a smaller ID value will win the communication arbitration.

Figure 3:
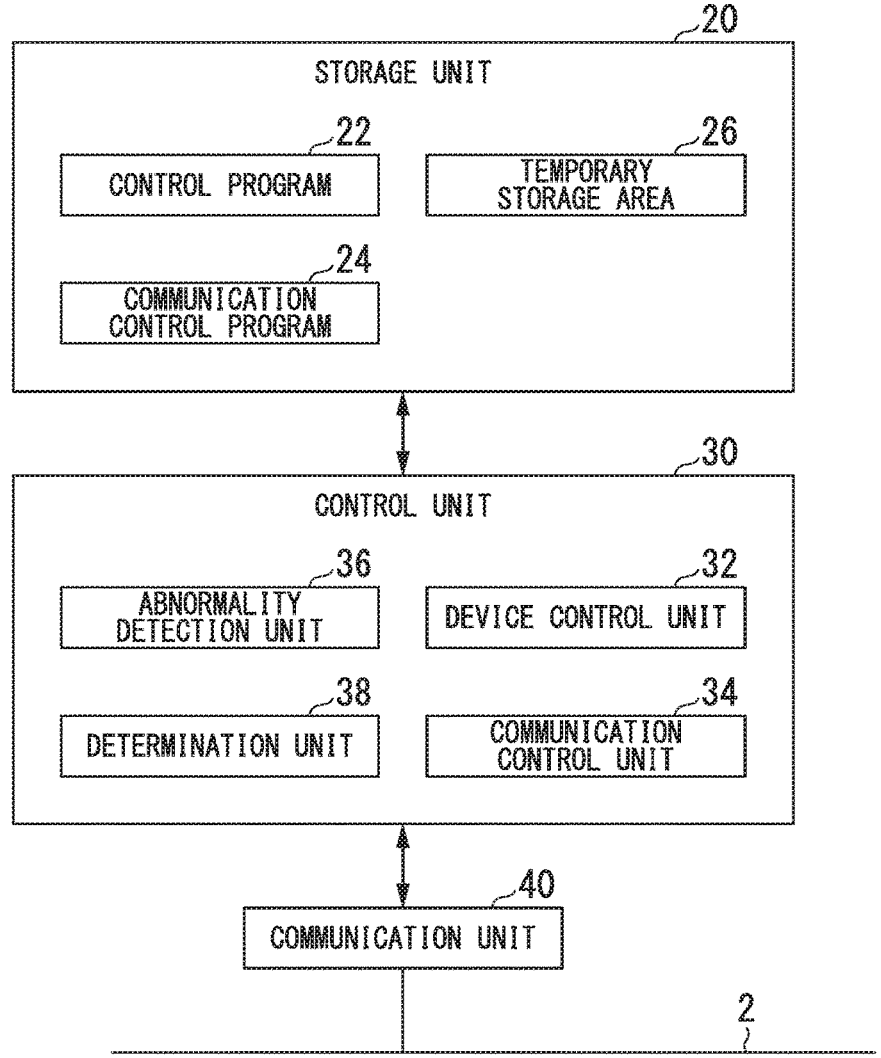
FIG. 3 is a diagram which shows a functional configuration of an ECU.

FIG. 3 is a diagram which shows a functional configuration of the ECU 10. The ECU 10 includes, for example, a storage unit 20, a control unit 30, and a communication unit 40. The control unit 30 is realized by, for example, a processor such as a central processing unit (CPU) executing a program stored in the storage unit 20. In addition, the control unit 30 may be realized by hardware such as large-scale integration (LSI), application specific integrated circuit (APIC), and a field-programmable gate array (FPGA), and include a circuit configuration for realizing a function of the control unit 30. Moreover, the control unit 30 may also be realized by software and hardware in cooperation.

The storage unit 20 is realized by a storage device such as a non-volatile storage device such as a read only memory (ROM), an electrically erasable and programmable read only memory (EEPROM), and a hard disk drive (HDD), and a volatile storage device such as a random access memory (RAM) or a register. The storage unit 20 stores a control program 22, a communication control program 24, and the like. In addition, the storage unit 20 has a temporary storage area 26 including a transmission buffer (not shown) and a reception buffer (not shown). In addition, the storage unit 20 stores information of a transmitted frame f, information of a received frame f, information concerning a communication protocol to be described below, and the like.

The control program 22 is a program for controlling equipment assigned to the ECU 10. The communication control program 24 is a program for controlling communication of the ECU 10.

The control unit 30 includes a device control unit 32, a communication control unit 34, an abnormality detection unit 36 (detection unit), and a determination unit 38. The device control unit 32 is realized by the control program 22 being executed, and executes control assigned to the ECU 10.

The communication control unit 34 is realized by the communication control program 24 being executed and controls communication of the ECU 10. The communication control unit 34 acquires information included in a frame f to be processed and stores the information in the temporary storage area 26 of the storage unit 20. The communication control unit 34 transmits a frame f to the communication unit 40 on the basis of information input to the ECU 10, information included in the acquired frame f, the communication control program 24, and the like.

In addition, the communication control unit 34 transmits a frame f on the basis of a plurality of different communication protocols (to be described below). The communication control unit 34 changes a communication protocol (a first communication protocol) used for communication to one of the plurality of communication protocols (for example, a second communication protocol). Specifically, the communication control unit 34 transmits a signal based on the second communication protocol without transmitting a signal based on a third communication protocol until a signal based on the second communication protocol is completely transmitted. The second communication protocol is a communication protocol in which at least two of a plurality of communication elements defined by the first communication protocol are changed. The third communication protocol is a communication protocol that is neither the first communication protocol nor the second communication protocol. The third communication protocol is, for example, a communication protocol in which only one of the plurality of communication elements defined by the first communication protocol is changed.

For example, a signal based on the second communication protocol in which two elements have been changed is changed before the transmission of a next frame f. The next frame f is a signal to be transmitted immediately after a predetermined state occurs. The occurrence of a predetermined state is, for example, when an abnormality is detected by the abnormality detection unit 36, when a predetermined frame f is received, or when a state of the communication system 1 or states of the ECU 10 and the like of the communication system 1 are changed to states set in advance.

Communication protocols are communication rules or regulations set in advance in the communication system 1. These communication protocols are set, for example, for each frame f to be transmitted or received or for each ECU 10. In addition, the communication protocol includes a plurality of communication elements set for each frame. The plurality of communication elements include at least one of a frame transmission order, a frame transmission timing, a frame transmission cycle, frame identification information (ID), a frame data length, a regulation when frame information is encrypted, a regulation when a frame error detection code is generated, and a regulation when an alive counter is given to a frame.

Next, communication elements and changes in the communication elements will be described. A case in which a transmission order of frames is changed is, for example, a case in which frames transmitted in an order of frames (A), (B), and (C) which are set by a predetermined communication protocol are transmitted in an order of frames (C), (B), and (A). When the transmission timing of frames is changed, for example, a frame f is transmitted at a timing different from a transmission timing set by a predetermined communication protocol.

The frame data length is a size of the region of a data field which is the substance of a frame f to be transferred or a size of the region of an arbitrary frame included in a frame f. When the frame data length is changed, the frame data length is changed such that a size of the region of a frame field is doubled, or is changed such that the region of a frame from data field to end of frame is doubled (refer to FIG. 2).

A change of the regulation when frame information is encrypted is a change from an encryption method set by a predetermined communication protocol to another encryption method. This includes a change in an operation expression and an encryption key used for encryption of a signal. The regulation when a frame error detection code is generated is an operation method when a CRC sequence is given on the basis of an SOF, an ID, a control field, and a data field included in a frame f to be transmitted. A change in the regulation when a frame error detection code is generated is a change in the operation method described above.

The regulation when an alive counter is given is, for example, a regulation in which alive counters given to a frame to be transmitted at each time are given as "00," "01," "02," "03," "00," and "01," or a regulation in which alive counters are given as "00," "01," "02," "03," "02," and "01" at a time t, a time t+1, . . . , a time t+4, and a time t+5. A change in the regulation when an alive counter is given is, when counting up of an alive counter is regarded as a preset regulation when an alive counter is given, a change in the counting up of alive counters such that, for example, alive counters are added by two instead of by one. The changes in communication elements exemplified above are examples, and other change methods may also be used.

The abnormality detection unit 36 is realized by the communication control program 24 being executed, and detects an abnormality in a communication state of the ECU 10. The abnormality includes, for example, an abnormality of the communication system 1, an abnormality of the communication path 2, an abnormality of the ECU 10, an abnormality of a transmitted or received frame f, and the like.

The determination unit 38 determines that an acquired frame f is an unauthorized frame f when only one of the plurality of communication elements is changed. The determination unit 38 does not determine that an acquired frame f is an unauthorized frame f when two of the plurality of communication elements are changed.

The communication unit 40 communicates with other devices on the basis of control of the communication control unit 34.

[Example of Processing of ECU 10 on Transmission Side]

Figure 4:
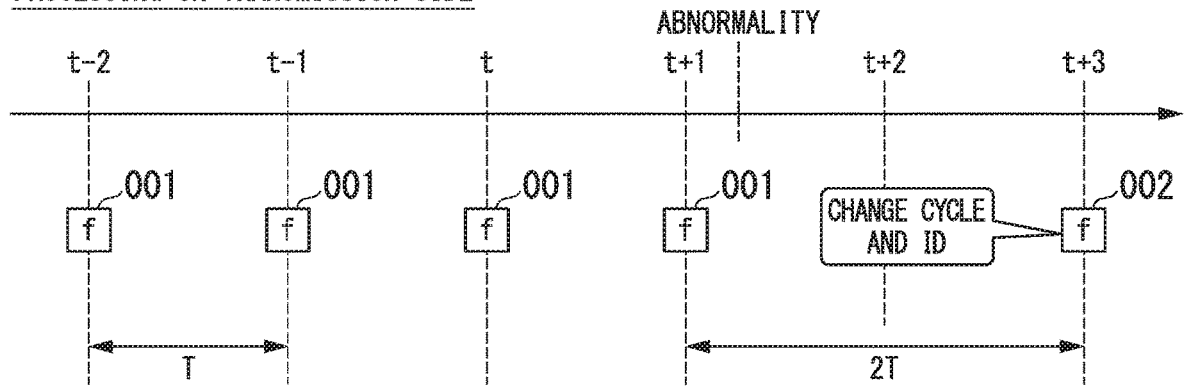
FIG. 4 is a diagram for describing processing of the ECU on a transmission side.

The communication control unit 34 on a transmission side transmits, for example, a frame f whose ID and cycle are changed with respect to a frame f of the first communication protocol. FIG. 4 is a diagram for describing processing of the ECU 10 on a transmission side. Processing of a case in which the ECU 10 transmits a frame f having a predetermined ID ("ID001") to the communication path 2 will be described as an example in the present processing. In addition, it is assumed that transmission of the frame f having "ID001" for each cycle T in the communication system 1 is set as the first communication protocol.

The communication control unit 34 of the ECU 10 on a transmission side transmits a frame f of the first communication protocol for each cycle T from a time t−2. Then, it is assumed that an abnormality is detected by the abnormality detection unit 36 after the communication control unit 34 transmits the frame f "ID001" at the time t+1 (for example, when ¼ of a cycle has elapsed from the time t+1). In this case, the communication control unit 34 changes a communication protocol of the frame f from the first communication protocol to the second communication protocol, and transmits the frame f. The second communication protocol is a frame f in which at least two communication elements among a plurality of communication elements defined by the first communication protocol are changed. In the present processing, the second communication protocol is, for example, a protocol in which a cycle (timing) for transmitting a frame f and an ID are changed with respect to the first communication protocol. The communication control unit 34 transmits a frame f "ID002" at a time t+3 at which a cycle 2T has elapsed from the time t+1.

[Example of Processing of ECU 10 on Reception Side]

When a frame f whose ID and cycle have been changed with respect to a frame f of the first communication protocol is received, the ECU 10 on a reception side determines that the received frame f is an intentionally transmitted frame f. Information on the second communication protocol (two communication elements changed by the ECU 10 on a transmission side) is stored in the storage unit 20 of the ECU 10 of the communication system 1. For this reason, when the determination unit 38 of the ECU 10 on a reception side receives a frame f in which two communication elements are changed with respect to the first communication protocol, the determination unit 38 compares the second communication protocol stored in the storage unit 20 with the changed communication elements in the received frame f, and determines whether the received frame f is an intentionally transmitted frame f.

Figure 5:
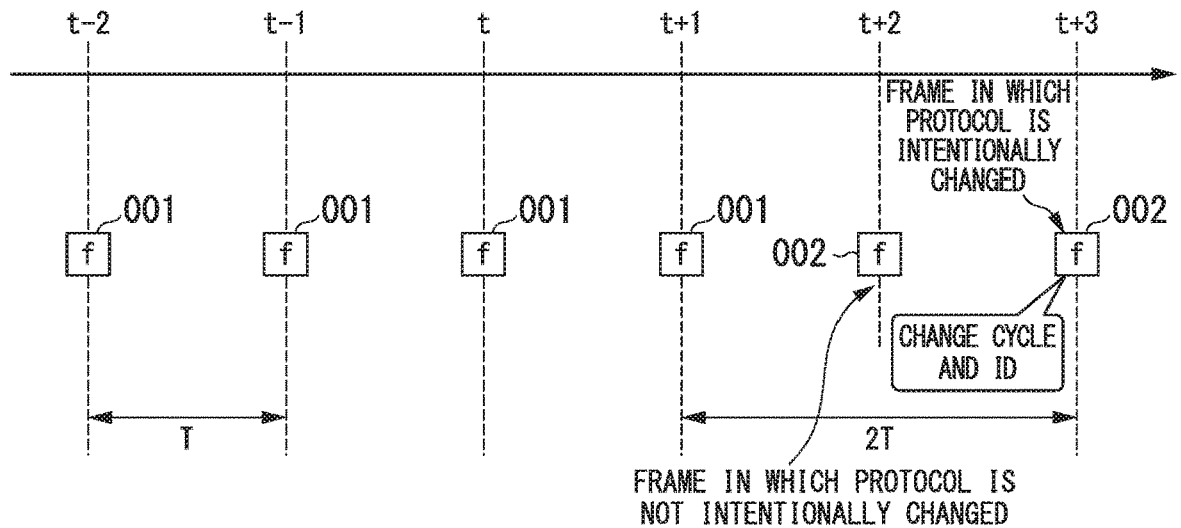
FIG. 5 is a diagram for describing processing of the ECU on a reception side.

FIG. 5 is a diagram for describing processing of the ECU 10 on a reception side. Only a frame f transmitted from an ECU 10-1 is transmitted normally to the communication path 2 from a time t−2 to a time t+3, but it is described that an unintended frame f "ID002" is transmitted from another device, an external device, or the like connected to the communication system 1 at the time t+2 in the example of FIG. 5.

The ECU 10 on a reception side receives the frame "ID001" for each cycle T from the time t−2. Then, the ECU 10 on a reception side receives the frame f "ID002" at the time t+2 after receiving the frame f "ID001" at the time t+1. That is, the ECU 10 on a reception side receives a frame f in which only one communication element (ID) has been changed from the frame f "ID001" received from each cycle T at the time t+1. In this case, the determination unit 38 of the ECU 10 on a reception side determines that the received frame f "ID002" is not a frame f in which a communication element is intentionally changed in the communication system 1. When the determination unit 38 of the ECU 10 on a reception side receives a frame f in which only one communication element is changed, the determination unit 38 determines that the received frame f is an unauthorized frame f.

When it is determined that the received frame f is an unauthorized frame f, the communication control unit 34 may shift to a predetermined fail safe mode, and may wait until a next frame f is received. The predetermined fail safe mode (first fail safe mode) is, for example, a mode for executing control to cause a vehicle to travel at a predetermined speed or a mode for executing control to cause a vehicle to safely stop.

In addition, the ECU 10 on a reception side receives a frame f in which two communication elements (cycle and ID) have been changed with respect to the frame f "ID001" received for each cycle T at the time t+3. In this case, the determination unit 38 of the ECU 10 on a reception side determines that the received frame f "ID002" is a frame f in which the communication element is intentionally changed.

When the determination unit 38 of the ECU 10 on a reception side receives a frame f in which two communication elements are changed, the determination unit 38 determines that the received frame f is not an unauthorized frame f. When the frame f in which two communication elements are changed is received as described above, the communication control unit 34 may determine that the received frame f is a frame in which the communication protocol is intentionally changed on the basis of the ECU 10 on a transmission side detecting a predetermined abnormality, and shift to a predetermined fail safe mode. The fail safe mode (second fail safe mode) at this time may be a fail safe mode different from a fail safe mode (first fail safe mode) performed when it is determined that the received frame f described above is an unauthorized frame f.

In addition, when a frame f in which two communication elements are changed is received, the communication control unit 34 may change a communication protocol of a frame f transmitted to another device by the ECU 10 from the first communication protocol to the second communication protocol and may transmit a frame f of the second communication protocol to another device. In this case, in the second communication protocol, two communication elements may be changed in a frame f received by the ECU 10 on a reception side, and communication elements may be different from the two communication elements described above. When two communication elements different from the two communication elements changed in the received frame f are changed, information on two communication elements changing for each ECU 10 is stored in the storage unit 20 of each ECU 10. As a result, the ECU 10 on a reception side can recognize two communication elements changed by the ECU 10 on a transmission side.

When the determination unit 38 of the ECU 10 on a reception side determines that a calculated CRC does not coincide with a CRC value included in a frame f, the determination unit 38 may determine that a received frame f is not an intentionally transmitted frame f. As a result, it is more accurately determined whether a received frame f is an intentionally transmitted frame f.

As described above, the communication control unit 34 of the ECU 10 on a transmission side changes at least two communication elements among a plurality of communication elements defined by the first communication protocol and transmits a frame f which is a signal based on the second communication protocol when a predetermined communication state is detected. The ECU 10 on a reception side can determine that there is a frame in which the communication element is intentionally changed when a frame f in which two communication elements that are signals based on the second communication protocol are changed is received.

[Another Example (1) of Processing of ECU 10 on Transmission Side]

Figure 6:
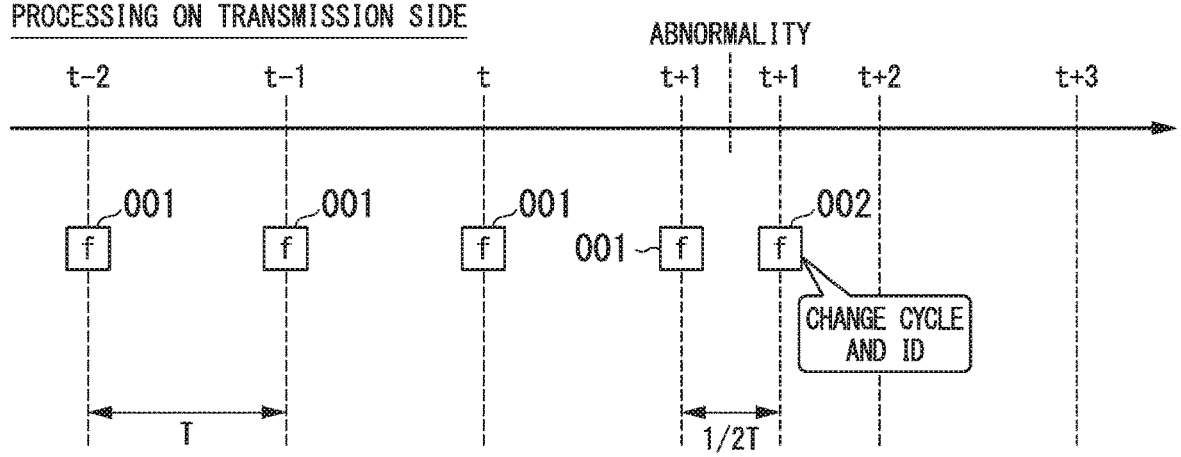
FIG. 6 is a diagram for describing another example (1) of the processing of the ECU on a transmission side.

The communication control unit 34 on a transmission side, for example, lengthens a cycle for a frame f of the first communication protocol and transmits the frame f in the example of FIG. 4, but shortens at least a cycle (½T) for a frame f of the first communication protocol and transmits the frame f in the example of FIG. 6. Details that are the same as in FIG. 4 will not be described.

It is assumed that an abnormality is detected by the abnormality detection unit 36 after the communication control unit 34 transmits the frame f "ID001" at the time t+1 (for example, when ¼ of a cycle has elapsed from the time t+1). In this case, the communication control unit 34 sets a cycle for transmitting a frame f as a cycle ½T, and transmits a frame f "ID002" in which the ID has been changed to "ID002" next with respect to the first communication protocol.

The communication control unit 34 of the ECU 10 on a reception side determines that a received frame f is a frame f which is intentionally transmitted when a frame f "ID002" in which the transmission cycle and the ID have been changed is received with respect to the first communication protocol transmitted to the ECU 10 on a transmission side.

[Another Example (2) of Processing of ECU 10 on Transmission Side]

Figure 7:
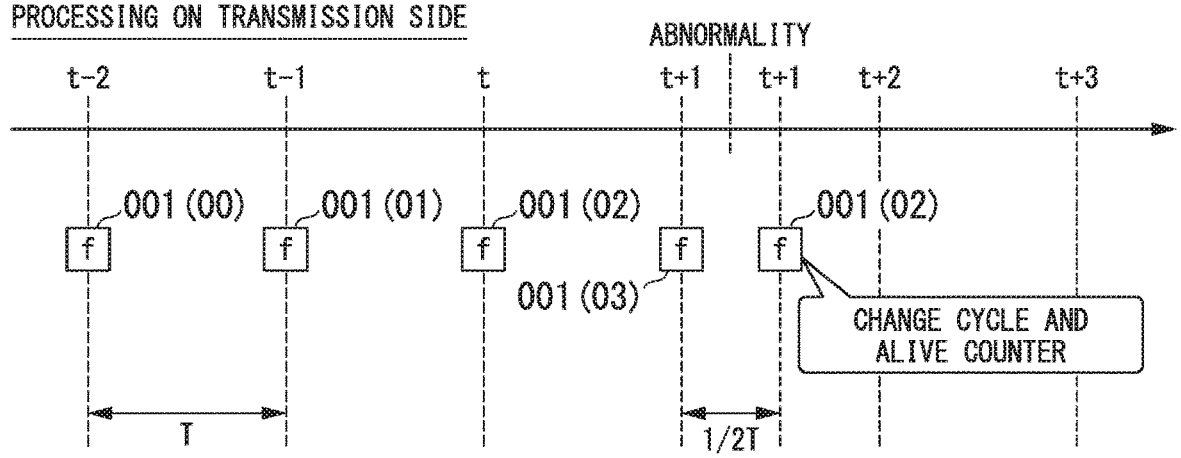
FIG. 7 is a diagram for describing another example (2) of the processing of the ECU on a transmission side.

In the example of FIG. 7, the communication control unit 34 on a transmission side shortens a cycle (½T) and changes a regulation in which an alive counter is given to a frame f of the first communication protocol. Details that are the same as in FIG. 4 will not be described.

It is assumed that an abnormality is detected by the abnormality detection unit 36 after the communication control unit 34 transmits the frame "ID001" at a time t+1 (for example, when ¼ of a cycle has elapsed from the time t+1). In this case, the communication control unit 34 sets a cycle (timing) for transmitting a frame f as a cycle ½T, and transmits a frame f with a changed regulation of giving an alive counter next with respect to the first communication protocol. In the example of FIG. 7, the communication control unit 34 repeatedly performs the counting up such that an alive count is "00" . . . "03," and "00" . . . "03" for each frame f to be transmitted before an abnormality is detected, but an alive counter is counted down after an abnormality is detected. In the example of FIG. 7, when an abnormality is detected after the frame f to which an alive counter "03" is given is transmitted, a frame f to which an alive counter "02" is given is transmitted.

When a frame f having an alive counter given by changing a regulation at the time of a transmission cycle and an alive counter being given is received with respect to the first communication protocol transmitted by the ECU 10 on a transmission side, the communication control unit 34 of the ECU 10 on a reception side determines that the received frame f is an intentionally transmitted frame f.

[Another Example (3) of Processing of ECU 10 on Transmission Side]

Figure 8:
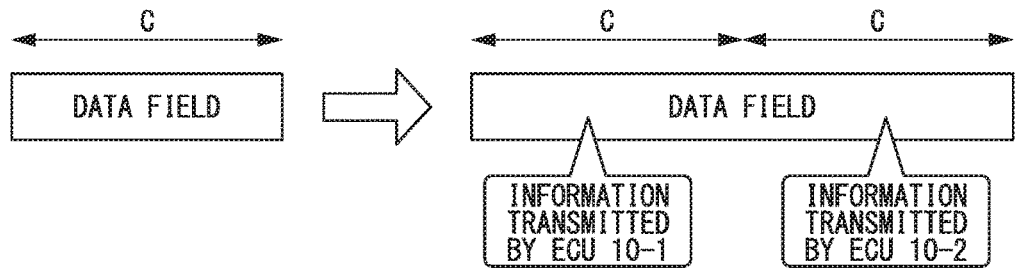
FIG. 8 is a diagram for describing another example (3) of the processing of the ECU on a transmission side.

The communication control unit 34 on a transmission side may shorten a cycle (½T) and extend a data length longer than a data length (data field) set by a predetermined communication protocol with respect to a frame f of the first communication protocol. FIG. 8 is a diagram which shows an example of a frame f having a data length set by the predetermined communication protocol and a frame f having an extended data length longer than the data length described above. For example, the communication control unit 34 transmits a frame f having a data length that is twice the data length set by the predetermined communication protocol as a next frame f. For example, when it is detected that a frame f has not been transmitted in a case in which an ECU 10-2 transmits a frame f to the ECUs 10-1 and 10-3, and receives a frame f from the ECU 10-1 at a predetermined cycle in the example of FIG. 1 described above, it is determined that there is an abnormality in the ECU 10-1. In this case, the communication control unit 34 of the ECU 10-2 sets a data length to be twice a data length before an abnormality is detected, includes information transmitted by the communication control unit 34 of the ECU 10-2, and information transmitted to the ECU 10-3 by the ECU 10-1 in a data field, and transmits it to the ECU 10-3. The information transmitted to the ECU 10-3 by the ECU 10-1 is stored in the storage unit 20 of the ECU 10-2 in advance.

As a result, even when an abnormality occurs in the ECU 10-1, since the information transmitted to the ECU 10-3 by the ECU 10-1 is transmitted to the ECU 10-3 by the ECU 10-2, a state of the communication system 1 can be stabilized.

[Another Example (4) of Processing of ECU 10 on Transmission Side]

Figure 9:
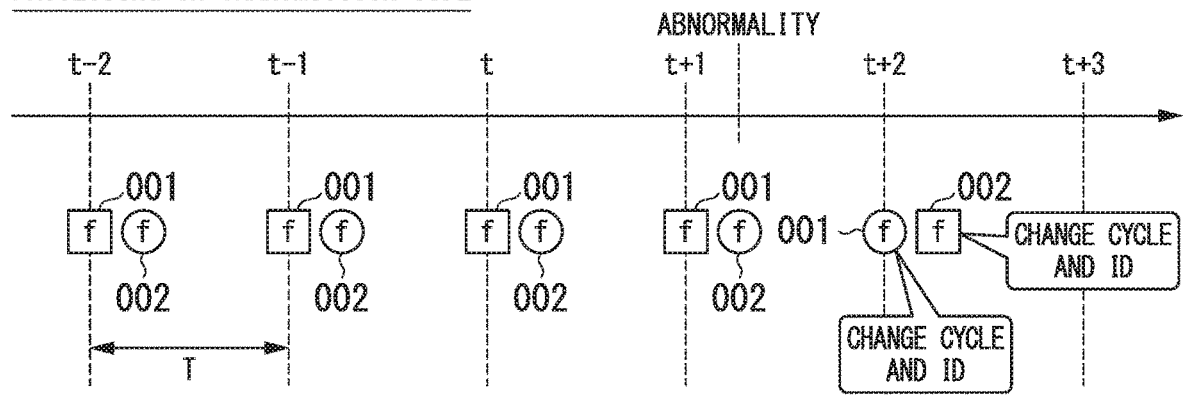
FIG. 9 is a diagram for describing another example (4) of the processing of the ECU on a transmission side.

In the example of FIG. 9, a case in which the transmission order of a frame f is changed will be described. In the first communication protocol in the example of FIG. 9, it is assumed that the frame "ID002" is transmitted immediately after the frame f "ID001" is transmitted, and each of the frame f "ID001" and the frame f "ID002" is transmitted for each cycle T. Details that are the same as in FIG. 4 will not be described.

It is assumed that an abnormality is detected by the abnormality detection unit 36 after the communication control unit 34 transmits the frame f "ID001" at the time t+1 (for example, when ¼ of a cycle has elapsed from the time t+1). In this case, the communication control unit 34 changes a communication protocol of the frame f from the first communication protocol to the second communication protocol, and transmits the frame f. The second communication protocol in the example of FIG. 9 is that the transmission order of frames f transmitted at the time t+1 is switched and the ID of each frame f is changed.

When two frames f whose transmission order and IDs have been changed are received with respect to the first communication protocol transmitted to the ECU 10 on a transmission side, the communication control unit 34 of the ECU 10 on a reception side determines that the two frames f are intentionally transmitted frames f.

[Another Example (5) of Processing of ECU 10 on Transmission Side]

Figure 10:
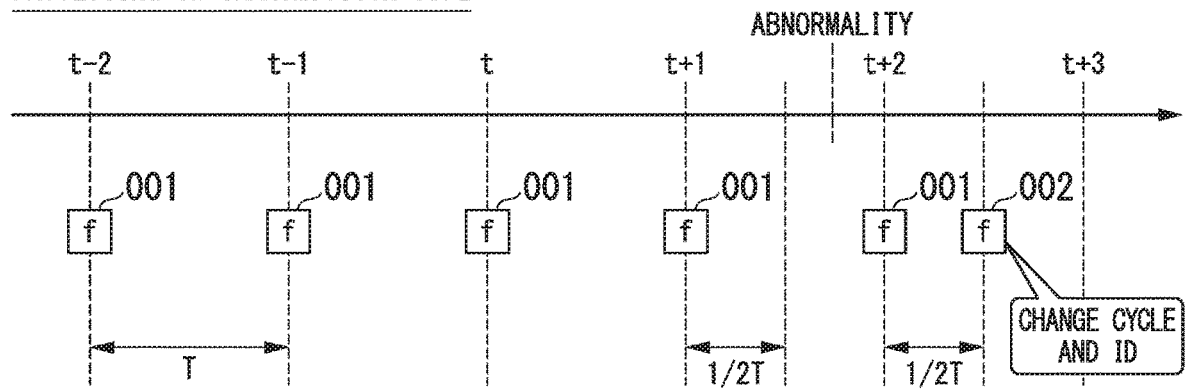
FIG. 10 is a diagram for describing another example (5) of the processing of the ECU on a transmission side.

In the example of FIG. 10, when a cycle is changed to ½T in the second communication protocol, processing of a case in which an abnormality is detected when a cycle ¾T has elapsed from the time t+1 will be described. When the communication control unit 34 cannot change at least two communication elements among a plurality of communication elements defined by a communication protocol before a next frame is transmitted, the communication control unit 34 changes at least two communication elements among a plurality of communication elements defined by a communication protocol before a frame f following the next frame f is transmitted.

The communication control unit 34 cannot transmit a frame f at a cycle ½T from the time t+1 if an abnormality is detected when a cycle ¾T has elapsed from the time t+1. For this reason, the communication control unit 34 transmits a frame f of the first communication protocol (a next signal) at the time t+2, and transmits a frame f which is changed to the second communication protocol at a cycle ½T from the time t+2 (a signal following the next signal). The frame f of the second communication protocol is a frame f whose cycle and ID are changed with respect to the frame f of the first communication protocol.

The communication control unit 34 of the ECU 10 on a reception side handles a frame f transmitted by the ECU 10 on a transmission side at the time t+2 as a frame f transmitted in the same manner as frames f transmitted at the time t+1 and before the time t+1. In addition, the communication control unit 34 of the ECU 10 on a reception side determines that a frame f transmitted by the second communication protocol at the time t+2 is an intentionally transmitted frame f.

[Flowchart]

Figure 11:
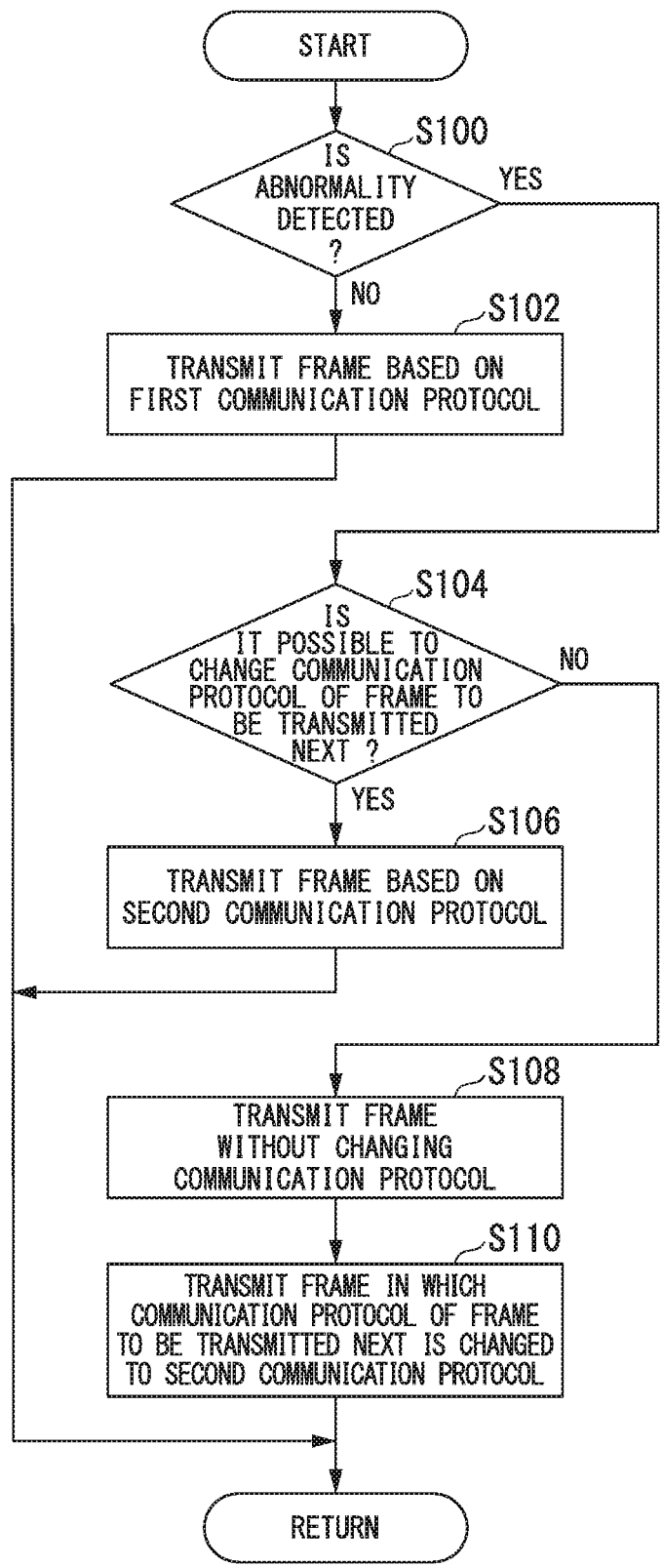
FIG. 11 is a flowchart which shows a flow of processing executed by the ECU on a transmission side.

FIG. 11 is a flowchart which shows a flow of processing executed by the ECU 10 on a transmission side. First, the processing waits until the abnormality detection unit 36 of the ECU 10 detects an abnormality (step S100). When an abnormality is not detected, the communication control unit 34 transmits a frame f to the communication path 2 on the basis of the first communication protocol (step S102). When an abnormality is detected, the communication control unit 34 determines whether a communication protocol of a frame f to be transmitted next can be changed to the second communication protocol (step S104).

When the communication protocol of a frame f to be transmitted next can be changed to the second communication protocol, the communication control unit 34 transmits a frame f on the basis of the second communication protocol (step S106). When the communication protocol of a frame f to be transmitted next cannot be changed to the second communication protocol, the communication control unit 34 transmits a frame f without changing the communication protocol (step S108).

The case in which the communication protocol of a frame f to be transmitted next cannot be changed to the second communication protocol is a case in which an abnormality is detected at ½ cycle having elapsed from a time at which a frame f is received before the abnormality is detected when the communication control unit 34 changes a cycle to ½T as described in FIG. 10 as the second communication protocol. In addition, the case in which the communication protocol of a frame f to be transmitted next cannot be changed to the second communication protocol is a case in which a preset condition is not satisfied, or a case in which it is difficult to change the communication protocol of a frame f to the second communication protocol in the ECU 10 in a state in which preparation for transmitting a frame f using the first communication protocol is in progress.

Next, after a frame is transmitted in step S108, a communication protocol of a frame f to be transmitted next is changed to the second communication protocol, and a frame f of the second communication protocol is transmitted (step S110). As a result, one routine processing of the present flowchart ends.

Due to the processing described above, the ECU 10 can transmit a frame f in which an intentional change of communication elements can be recognized on a reception side.

In the embodiments described above, an example in which two communication elements among a plurality of communication elements are changed before a next signal is transmitted has been described, but three or more communication elements may also be changed instead of two communication elements before a next signal is transmitted. In addition, two communication elements may be changed in the transmission of an Nth signal instead of changing two communication elements before a next signal is transmitted ("N" is an arbitrary natural number).

According to the embodiment described above, in the ECU 10 which includes the communication control unit 34 capable of transmitting a frame f based on a plurality of different communication protocols and changing the communication protocol used for communication from a first communication protocol to a second communication protocol, the communication control unit 34 does not transmit a signal based on a third communication protocol until a signal based on the second communication protocol is transmitted, and transmits a signal based on the second communication protocol in which at least two communication elements among a plurality of communication elements defined by the first communication protocol are changed, and thereby it is possible to transmit a frame f in which an intentional change of communication elements can be recognized on a reception side.

Embodiments of the present invention have been described above with reference to the drawings, but the present invention is not limited to the embodiments, and various modifications and substitutions can be made in a range not departing from the gist of the present invention.

What is claimed is:

1. A receiving device comprising:
a communication unit configured to communicate with a communication device comprising:
a communication control unit configured to transmit a signal based on a plurality of different communication protocols and changing a communication protocol used for communication from a first communication protocol to a second communication protocol, and
a detection unit configured to detect an abnormality of a network,
wherein the communication control unit does not transmit a signal based on a third communication protocol until a signal based on the second communication protocol is transmitted, and transmits the signal based on the second communication protocol in which at least two of a plurality of communication elements defined by the first communication protocol are changed, and
wherein the communication control unit changes a communication protocol used for communication from the first communication protocol to the second communication protocol in response to detection of a predetermined abnormality by the detection unit; and
a determination unit configured to determine that, in response to determining that only one communication element among the plurality of communication elements is changed in a signal received by the communication unit, the received signal is an unauthorized signal.

2. The receiving device according to claim 1,
wherein the determination unit does not determine that, when two communication elements set in advance among the plurality of communication elements are changed in a signal received by the communication unit, the received signal is an unauthorized signal.

3. A receiving device comprising:
a communication unit configured to communicate with a communication device comprising:
a detection unit configured to detect an abnormality of a network; and
a communication control unit configured to transmit a signal based on a plurality of different communication protocols and to change a communication protocol used for communication from a first communication protocol to a second communication protocol in response to detection of a predetermined abnormality by the detection unit,
wherein the communication control unit transmits a signal based on the second communication protocol in which at least two of a plurality of communication elements defined by the first communication protocol are changed; and
a determination unit configured to determine that, when only one communication element among a plurality of communication elements set by a predetermined communication protocol is changed in a signal received by the communication unit, the received signal is an unauthorized signal, and to not determine that, when at least two communication elements among the plurality of communication elements are changed, the received signal is an unauthorized signal.

4. The receiving device according to claim 3, wherein the communication control unit is further configured to execute a first fail safe mode in response to determining that only one communication element among the plurality of communication elements is changed in a signal received by the communication unit and to execute a second fail safe mode in response to determining that at least two communication elements among the plurality of communication elements are changed in a signal received by the communication unit.

5. The receiving device according to claim 3, wherein the at least two of the plurality of communication elements defined by the first communication protocol include at least two of a transmission order of the signal, a transmission timing of the signal, a transmission cycle of the signal, identification information of the signal, a data length of the signal, a regulation for encryption of the signal, a regulation for generating an error detection code of the signal, and a regulation for giving an alive counter to the signal.

* * * * *